(12) United States Patent
Noltemeyer

(10) Patent No.: US 7,089,672 B2
(45) Date of Patent: Aug. 15, 2006

(54) OPTICAL ANGLE AND TORQUE SENSOR

(75) Inventor: Ralf Noltemeyer, Wernau (DE)

(73) Assignees: Robert Bosch GmbH, Stuggart (DE);
Bo Bishop Innovation Ltd., North Ryde (AU)

( * ) Notice: Subject to any disclaimer, the term of this patent is extended or adjusted under 35 U.S.C. 154(b) by 98 days.

(21) Appl. No.: 10/503,858

(22) PCT Filed: Feb. 8, 2002

(86) PCT No.: PCT/EP02/01311

§ 371 (c)(1),
(2), (4) Date: Aug. 6, 2004

(87) PCT Pub. No.: WO03/067196

PCT Pub. Date: Aug. 14, 2003

(65) Prior Publication Data

US 2005/0081392 A1    Apr. 21, 2005

(51) Int. Cl.
*G01D 5/34* (2006.01)
(52) U.S. Cl. .................... 33/1 PT; 33/707; 250/231.13
(58) Field of Classification Search ............... 33/1 PT, 33/1 N, 1 L, 1 DD, 706, 707; 250/231.13, 250/231.14, 231.15, 231.16, 231.17, 231.18; 250/231.1; 356/218, 219, 220, 221, 222
See application file for complete search history.

(56) References Cited

U.S. PATENT DOCUMENTS

| 2,861,345 | A | * | 11/1958 | Spencer | 33/707 |
| 5,841,132 | A | * | 11/1998 | Horton et al. | 250/231.13 |
| 5,930,905 | A |   | 8/1999  | Zabler et al. | 33/1 PT |
| 6,172,753 | B1 | * | 1/2001 | Wagner | 356/614 |
| 6,240,652 | B1 | * | 6/2001 | Bobel et al. | 33/707 |
| 6,331,885 | B1 | * | 12/2001 | Nishi | 355/53 |
| 6,535,272 | B1 | * | 3/2003 | Ota et al. | 355/53 |
| 6,642,507 | B1 | * | 11/2003 | Kataoka | 250/231.13 |
| 6,975,408 | B1 | * | 12/2005 | Igaki et al. | 356/616 |
| 2002/0017616 | A1 | * | 2/2002 | Ota | 250/492.1 |
| 2005/0115087 | A1 | * | 6/2005 | Noltemeyer | 33/1 PT |

FOREIGN PATENT DOCUMENTS

| DE | 92 09 777 |   | 10/1992 |
| DE | 100 41 095 A |   | 6/2001 |
| DE | 199 62 309 A |   | 6/2001 |
| JP | 02071118 A | * | 3/1990 |
| WO | WO 88 00332 A |   | 1/1988 |
| WO | WO2000 28285 A |   | 5/2000 |

\* cited by examiner

*Primary Examiner*—R. Alexander Smith
(74) *Attorney, Agent, or Firm*—Kenyon & Kenyon LLP

(57) ABSTRACT

The present invention consists of an optical sensor for determining the angle and the torque of a rotatable object (13). The sensor contains at least one patterned surface (1) an ASIC (3), at least one lens (2) and at least one EMR source (16, 17). The ASIC (3) comprises processing means and an array of detectors for EMR. The at least one EMR source (16, 17) illuminates the patterned surface (1) and the at least one lens (2) focuses a part of the reflected EMR (5) from the patterned surface (1) onto the array of detectors for EMR. The patterned surface (1) contains a pattern including turning marks and laser marks (8). The at least one lens (2) focuses substantially EMR reflected by the turning marks (14) onto the array of detectors. The turning marks (14) are non-symmetrical.

9 Claims, 7 Drawing Sheets

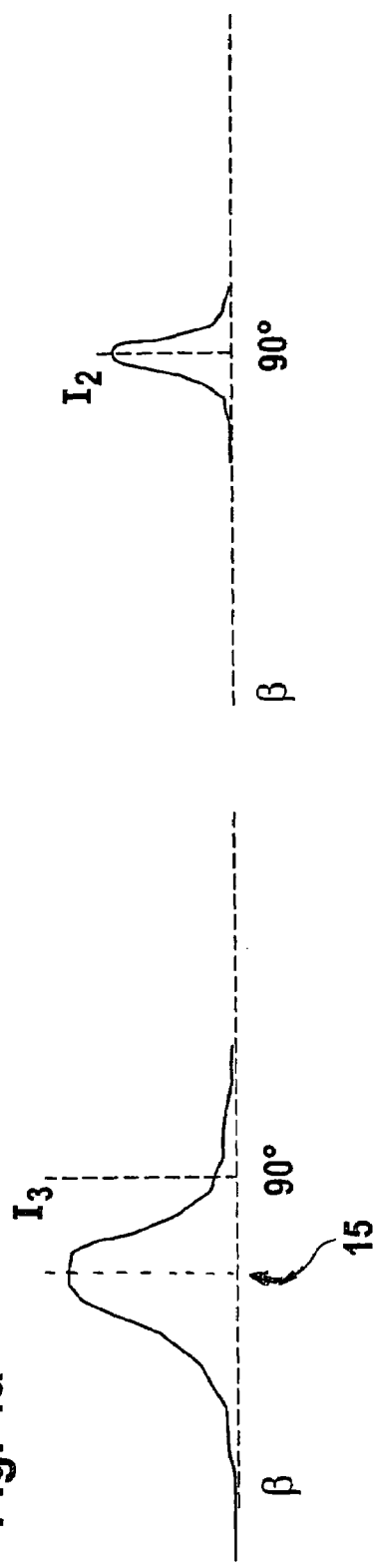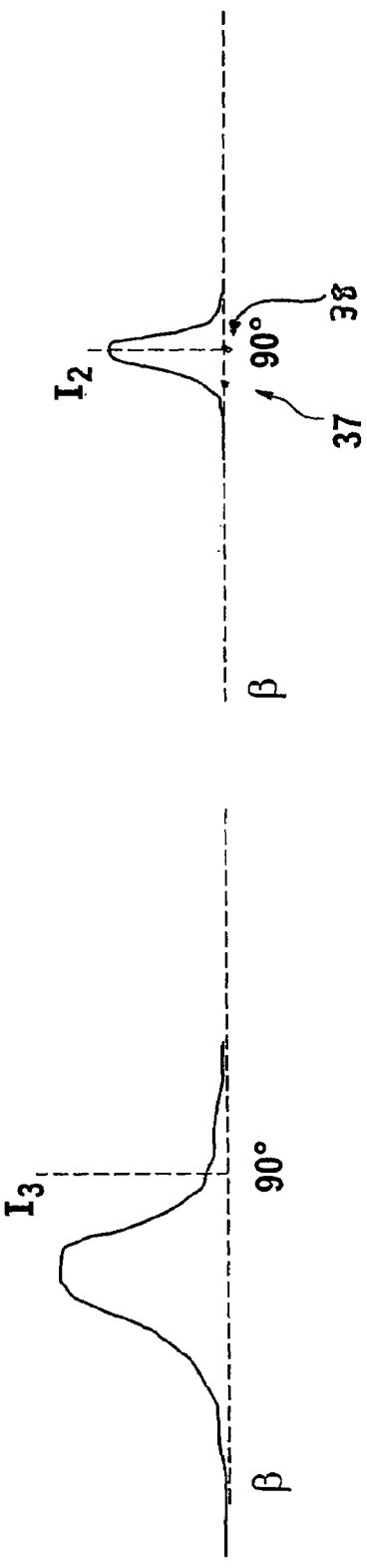

Prior Art

OPTICAL ANGLE AND TORQUE SENSOR

BACKGROUND OF THE INVENTION

Steer by-wire is an advanced steering concept for vehicles, that eliminates the mechanical connection between the steering wheel and the front wheel. All components of this vehicle steering system communicate digitally rather than mechanically. The drivers input over the steering wheel is converted into digital signals. Therefore, a sensor measures the torque and the angle of the steering wheel.

U.S. Pat. No. 5,930,905 discloses a method and a device for measuring the angle of a rotatable body, in particular a body rotatable by more than 360°. The rotatable body cooperates with at least two further rotatable bodies, for example gear wheels, where angular positions are determined with the aid of two sensors. The angular position of the rotatable body is determined from the detected angular positions by a modified nonius calculation so that unequivocal statements can be made, it is necessary for all three rotatable bodies or gear wheels to have defined predetermined numbers of teeth. The method and the device can be used for determining the steering wheel angle of a motor vehicle.

German Patent 10 041 095 is related to a device for measuring an angle and/or a torque on a rotatable body. The angle of rotation is detected by means of magnetic or optical sensors. In a preferred embodiment there are two devices, each provided with two optically readable code traces. The two code traces of each device are embodied in the same way and are arranged in such a way that said devices are offset against each other so that allocated sensors output a digital signal. The angle of rotation is calculated from the offset of the two digital signals. In another embodiment, a torsional element having a known torsional stiffness is arranged between the two devices. A torque that is transmitted by the rotatable body can thus be calculated from the difference angle of the two devices. This device is preferably used in the steering column shaft of a motor vehicle.

WO 00/28285 concerns an optical sensor for determining the position of a moveable surface having patterned regions of high and low reflectivity to EMR (electromagnetic radiation). The sensor comprises an ASIC (application specific integrated circuit), at least one lens and at least one EMR source. The ASIC comprises at least one array of EMR sensitive detectors and processing means. The EMR source facilitates illumination of the surface and the at least one lens facilitates the focusing of reflected EMR from the surface and generates an image on the at least one array of EMR sensitive detectors corresponding to the pattern on the surface. The ASIC, the at least one lens, and the at least one EMR source are all enclosed in a single housing providing accurate optical alignment of these elements and integrated as a single replaceable module. The processing means of the ASIC facilitates processing of the image to determine the position of the pattern on the surface.

According to the prior art, the pattern of the surface is formed, for example, by symmetrical turning marks and by laser marks thereon. The axis of symmetry of each symmetrical turning mark is positioned perpendicularly to the patterned surface. These marks may for example have a cross section in the form of a circular arc. The objective of the symmetrical turning marks is to reflect EMR coming from the EMR source into the image system containing at least one lens. As a result, the EMR reflected by the symmetrical turning marks produces a bright area on the array of EMR sensitive detectors. The laser marks consist of a flat surface on the patterned surface, designed for reflecting the EMR out of the image system. Consequently, the laser marks produce dark areas on the array of EMR sensitive detectors.

The resulting pattern of bright and dark areas can only be detected correctly, if the illumination efficiency is good and the contrast between dark and bright areas is high. These two parameters depend on the illumination angle between the EMR source and the patterned surface.

According to the prior art, high illumination efficiency is coupled with a low contrast and vice versa. As a result, the chosen illumination angle represents a compromise between optimizing the illumination efficiency on one side and the contrast on the other side.

SUMMARY OF THE INVENTION

The present invention has the advantage of increasing the illumination efficiency and the contrast between dark and bright areas at the same time. This advantage is reached by an optical sensor for determining the angle and the torque of a rotatable object. The sensor contains at least one patterned surface, an ASIC, at least one lens and at least one EMR source. The ASIC comprises processing means and an array of detectors for EMR. The at least one EMR source illuminates the patterned surface and the at least one lens focuses a part of the reflected EMR from the patterned surface on the array of detectors for EMR. The patterned surface contains a pattern including turning marks and laser marks. The at least one lens focuses substantially all of the EMR reflected by the turning marks onto the array of detectors. The turning marks are non-symmetrical.

The turning marks are non-symmetrical in the sense that they do not have a symmetry axis perpendicular to the patterned surface. Use of non-symmetrical turning marks has the advantage, that at certain illumination angles, the reflection intensity detected by the EMR sensitive detectors shows a maximum and simultaneously the contrast between the dark and bright areas is high.

BRIEF DESCRIPTION OF DRAWINGS

The present invention will be described on the basis of the accompanying drawings representing exemplary embodiments of the invention.

FIG. 4 shows graphs with the reflection intensity as a function of the illumination angle for non-symmetrical turning marks and laser marks as proposed by the present invention.

DETAILED DESCRIPTION OF THE INVENTION

Figure 1:
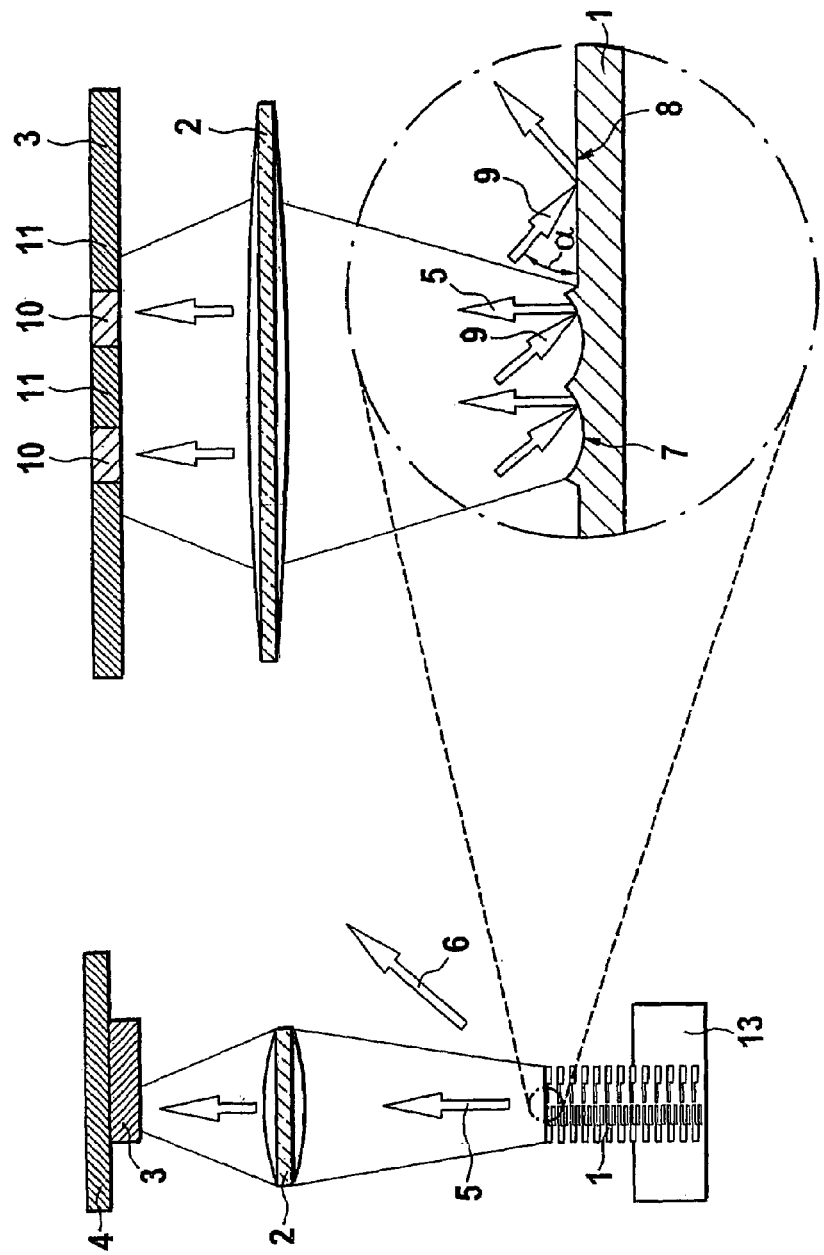
FIG. 1 shows the beam path of EMR reflected by symmetrical turning marks and laser marks (prior art).

FIG. 1 shows the beam path of EMR reflected by symmetrical turning marks and laser marks in the prior art.

The left part of FIG. 1 represents schematically a part of an optical sensor, including a patterned surface 1, a lens 2, an ASIC 3 (application specific integrated circuit) and a printed circuit board 4. The patterned surface 1 is illuminated by an EMR source (not shown). One part 5 of the EMR is reflected by the patterned surface 1 into the imaging system (lens 2) and another part 6 of the EMR is reflected by the patterned surface 1 out of the imaging system. The part 5 of the EMR which is reflected into the imaging system (lens 2) is focused by lens 2 onto the ASIC 3, producing bright areas on the ASIC 3. The other part 6 of the EMR, which is reflected out of the imaging system has the effect, that some areas on the ASIC 3 remain "dark". As a result an image of dark and bright areas is produced on the ASIC 3. The ASIC 3 comprises an array of detectors (not shown) detecting the EMR, which is focused onto the array of detectors. Furthermore, the ASIC 3 comprises processing means (not shown) for the evaluation of the signals produced by the array of detectors. The signals are dependent on the position of the patterned surface 1 at which the EMR is reflected. The actual field of view which is illuminated by the EMR source depends on the angular position of the code disk to which the patterned surface 1 is attached. One pattern in the field of view can be assigned unambiguously to one angular position of the code disk and the rotatable object 13 to which it is connected by evaluating the image of the pattern on the array of detectors of the ASIC 3.

On the right side of FIG. 1 the patterned surface is shown in magnification. The pattern on the patterned surface 1 includes symmetrical turning marks 7 and laser marks 8. In this case, the cross section of the symmetrical turning marks 7 has the form of a circular arc. The incident EMR 9 is reflected by the symmetrical turning mark 7 in the direction of the lens 2. This part 5 of the EMR, which is reflected into the image system (lens 2) is focused onto the ASIC 3, resulting in bright areas 10. The laser marks 8 are flat areas on the patterned surface 1, which are designed to reflect the incident EMR 9 out of the imaging system (lens 2). This part 6 of the EMR, which is reflected out of the imaging system is substantially not focused onto the ASIC 3. Therefore, some areas 11 remain "dark" on the ASIC 3. The contrast between the resulting dark and bright areas (11, 10) is low. Since the detection principle of the array of EMR detectors on the ASIC 3 is based on using the contrast to read the code structure of the patterned surface 1, it is advantageous to improve the signal-to-noise ratio. The signal-to-noise ratio is low in a sensor with symmetrical turning marks. The reason for the low signal-to-noise ratio and the low contrast can be seen in FIG. 2.

Figure 2:
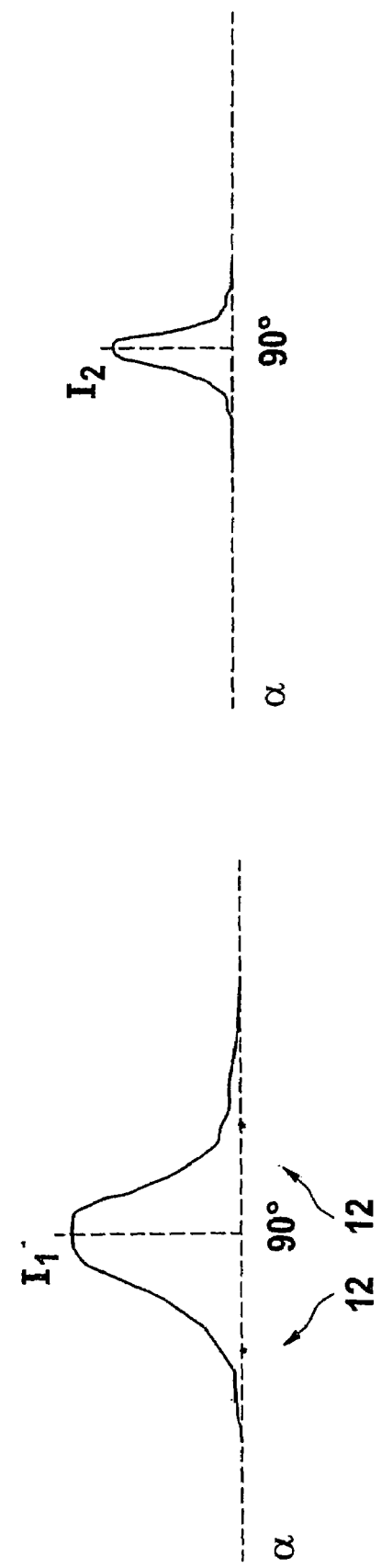
FIG. 2 shows a graph with the reflection intensity as a function of the illumination angle for symmetrical turning marks and laser marks (prior art).

FIG. 2 shows the reflection intensity as a function of the illumination angle $\alpha$ for symmetrical turning marks and for laser marks.

The left graph shows the reflection intensity $I_1$ of EMR reflected by symmetrical turning marks 7 as a function of the illumination angle $\alpha$. The illumination angle $\alpha$ is the angle between the incident EMR 9 and the flat part of the patterned surface 1 (see FIG. 1). In the left graph of FIG. 2 it can be seen, that the maximum reflection intensity $I_1$ from the symmetrical turning mark 7 is detected for an illumination angle $\alpha$ of 90°. The reflection intensity $I_1$ is a symmetrical function which has the form of a bell curve. It approaches the value of zero asymptotically with increasing and decreasing illumination angle $\alpha$ starting from the illumination angle of 90°.

The right graph of FIG. 2 shows the detected reflection intensity $I_2$ of EMR reflected by laser marks 8 as a function of the illumination angle $\alpha$. The reflection intensity $I_2$ also has the form of a bell curve with a maximum of 90°. The difference to the reflection intensity $I_1$ is that the intensity $I_2$ is smaller at its maximum and has a smaller extension. In order to avoid detecting EMR reflected by the laser marks, an illumination angle has to be chosen, under which the reflection intensity $I_1$ is high and the reflection intensity $I_2$ is low (preferably zero) at the same time. The arrows 12 in the left graph of FIG. 2 mark the illumination angles used in practice, which represent a compromise between optimizing the illumination efficiency on one side and the contrast on the other side. At these illumination angles 12, the signal-to-noise ratio is improved, since the reflection intensity $I_2$ (produced by the laser marks) is close to zero and therefore does not cause noise. On the other side, the illumination efficiency is very low, since with these illumination angles 12, the reflection intensity $I_1$ is very low.

Figure 3:
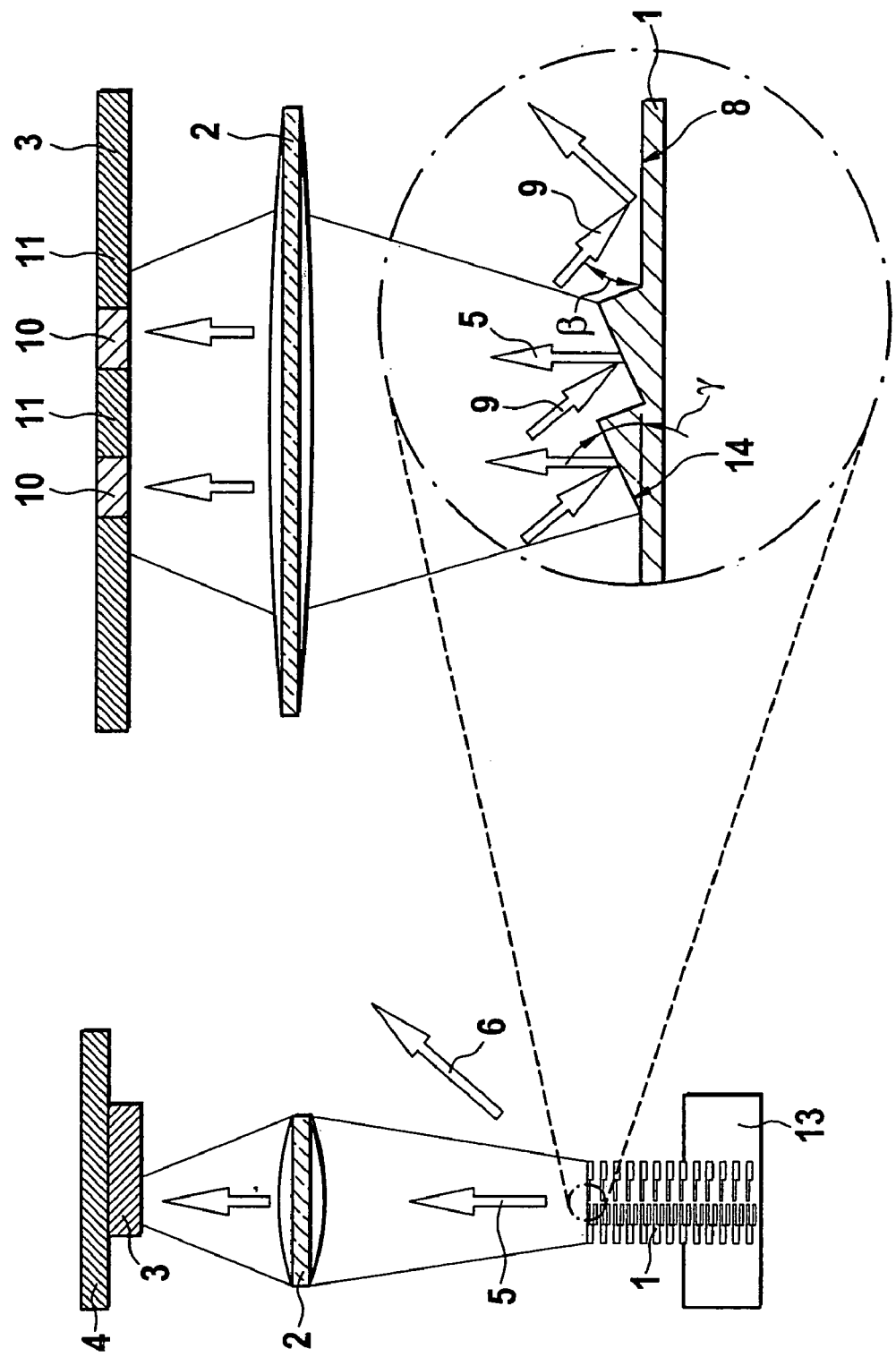
FIG. 3 shows the beam path of EMR reflected by non-symmetrical turning marks and laser marks as proposed by the present invention.

FIG. 3 shows the beam path of EMR reflected by non-symmetrical turning marks and laser marks as proposed by the present invention.

The principle of the sensor remains unchanged, as can be seen on the left part of FIG. 3. The optical sensor similarly contains a patterned surface 1 connected to a rotatable object 13 and reflecting one part 5 of incident EMR into the imaging system (lens 2) and another part 6 of the incident EMR 9 out of the imaging system. The lens 2 focuses the part 5 of the EMR onto an ASIC 3, which is positioned on a printed circuit board 4. The ASIC 3 detects the focused EMR and processes the resulting detection signals.

On the right side of FIG. 3, the patterned surface is shown in magnification. The pattern on the patterned surface 1 includes non-symmetrical turning marks 14 and laser marks 8.

In the preferred embodiment of the present invention shown in FIG. 3, the non-symmetrical turning marks 14 form a sawtooth surface on the patterned surface 1. The non-symmetrical turning marks 14 reflect the incident EMR 9 into the imaging system (lens 2) which focuses the EMR onto the ASIC 3, where it forms bright areas 10. The laser marks 8 reflect the incident EMR, which reaches the patterned surface 1 under an illumination angle $\beta$, out of the imaging system (part 6 of the incidental EMR). As a result, some areas 11 remain "dark" on the ASIC 3.

The advantages of the non-symmetrical turning marks 14 in comparison to the symmetrical turning marks 7 are visible in FIG. 4.

FIG. 4 shows graphs with the reflection intensity as a function of the illumination angle for non-symmetrical turning marks and laser marks as proposed by the present invention.

FIG. 4a shows two graphs, the left graph presenting the reflection intensity $I_3$ of EMR reflected by non-symmetrical turning marks 14 as a function of the illumination angle $\beta$. The maximum reflection intensity $I_3$ from the non-symmetrical turning marks 14 is detected for an illumination angle $\beta_a$ 15, which is smaller than 90°. The difference between 90° and the illumination angle 15 with the maximum reflection intensity $I_3$ depends on the form of the non-symmetrical turning marks. For non-symmetrical turning marks with the form of a sawtooth for example, this difference depends on the angle $\gamma$ of the sawtooth (see FIG.

3). The reflection intensity $I_3$ again as represented by a bell curve, is decreased significantly for an illumination angle $\beta$ of 90°.

The right graph of FIG. 4a shows the detected reflection intensity $I_2$ of EMR reflected by laser mark 8 as a function of the illumination angle $\beta$. The form of the reflection intensity is the same as in FIG. 2, since the laser marks have not been changed in the present invention. The maximum of the reflection intensity $I_2$ is still situated at an illumination angle of 90°.

In this case the most advantageous illumination angle $\beta_a$ 15, is the one with the maximum reflection intensity $I_3$. The effect of using this illumination angle is a combination of a high signal-to-noise ratio with a high illumination efficiency and a high contrast between dark and bright areas on the ASIC 3. The illumination of the patterned surface 1 under the illumination angle 15 produces the highest reflection intensity $I_3$ from the non-symmetrical turning marks 14. At the same time it produces a very low reflection intensity signal resulting from EMR reflected by the laser marks 8.

Therefore, one preferred embodiment of the present invention contains an EMR source which illuminates the patterned surface under an illumination angle $\beta_a$ 15, which produces a maximum reflection intensity $I_3$ of EMR reflected by the non-symmetrical turning marks 14.

Figure 5:
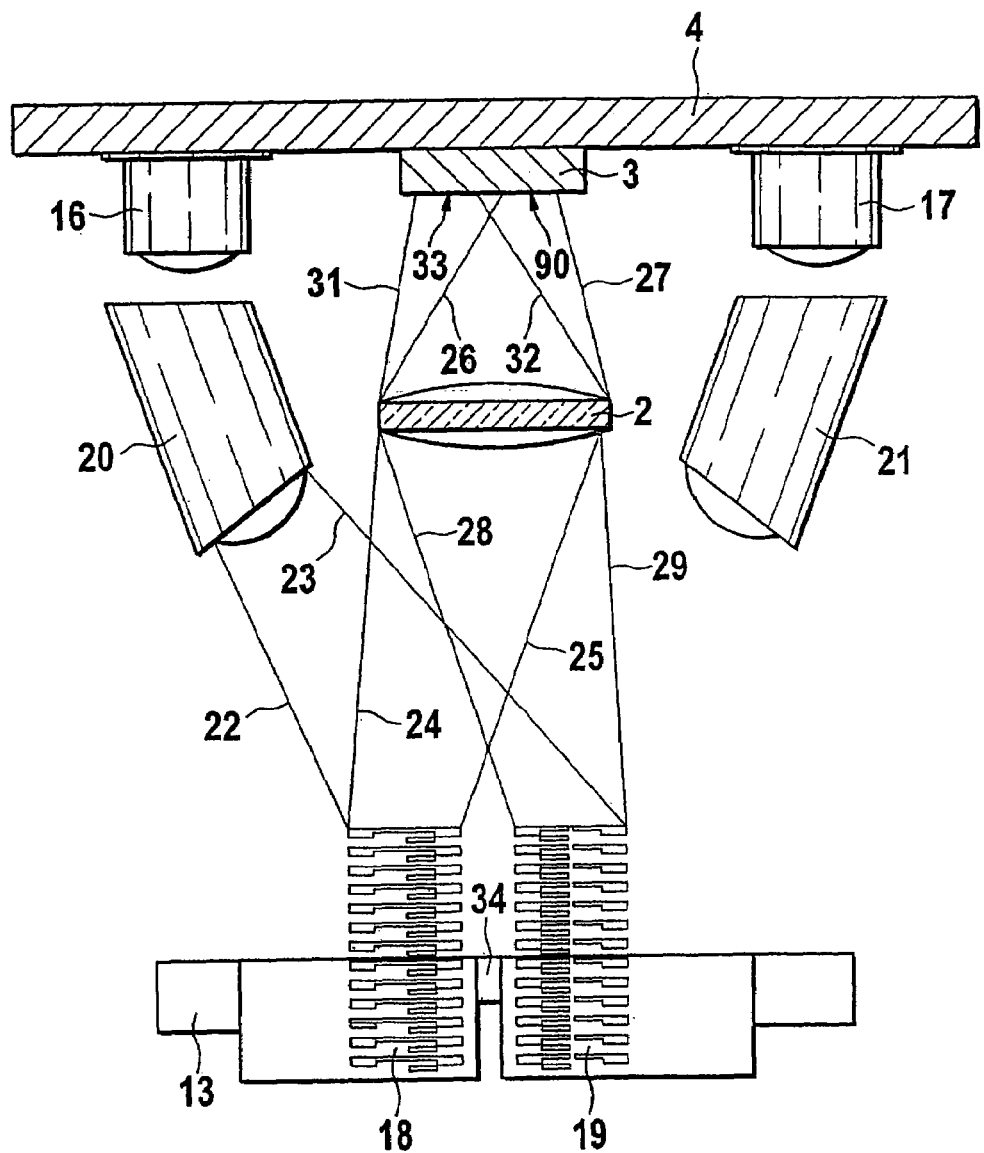
FIG. 5 shows the illumination and imaging concept of a sensor with symmetrical turning marks (prior art).

FIG. 5 shows the illumination and imaging concept of the sensor with symmetrical turning marks in the prior art.

Two code disks 18, 19 with a patterned surface 1 are attached to a rotatable object 13. The ASIC 3 and two EMR sources 16, 17 (light emitting diodes, LEDs) are mounted on a single printed circuit board 4. Two EMR guides 20, 21 are used to convey EMR from the two EMR sources 16, 17 to the two turnable code disks 18, 19, in order to minimize optical losses. These EMR guides 20, 21 may consist of EMR transmitting plastic tubes or glass fibres. A lens 2 serves for focusing EMR on the ASIC 3. It images the field of view onto the array of EMR detectors on the ASIC 3.

In FIG. 5 a beam path is shown, which illustrates how this imaging concept operates. The first EMR source 16 emits EMR, which is conveyed by the first light guide 20 to the first code disk 18. This incident EMR is represented by the two beams 22, 23 which reach the outer limits of the illuminated code disks 18, 19. Both code disks 18, 19 are illuminated by the incident EMR emitted by the first EMR source 16. On the first code disk 18, the incident EMR is reflected by the symmetrical turning mark 7 (not shown) onto the lens 2. The EMR reflected by code disk 18 in this direction is represented by the two beams 24, 25. The lens 2 focuses this reflected EMR onto the ASIC 3 (beams 26, 27), where an image 30 of the pattern in the field of view on the first code disk 18 is produced. It is preferred, that the array of detectors on the ASIC 3 for detecting the reflection intensities of the image on the ASIC 3 is an array of photo diodes. The symmetrical turning marks on the second code disk 19 also reflect the incident EMR in the direction of the lens 2 (beams 28, 29) and the EMR is focused onto another region of the ASIC 3 (beams 31, 32). In this region of the ASIC 3 an image 33 of pattern in the field of view on the second code disk is produced. The beam path of EMR emitted by the second EMR source 17 is similar to the one from the first EMR source 16, with the only difference, that it is mirrored on a symmetry axis between the two EMR sources 16, 17. This beam path is not shown in FIG. 5 in order to simplify the figure.

The assembly as shown in FIG. 5 is not only capable of measuring the absolute angle of the rotatable object 13, but can also be part of a torque-sensing system. The two code disks 18, 19 are therefore connected by a member 34 of predetermined torsional stiffness and by evaluating their relative angle, the torque can be calculated.

Figure 6:
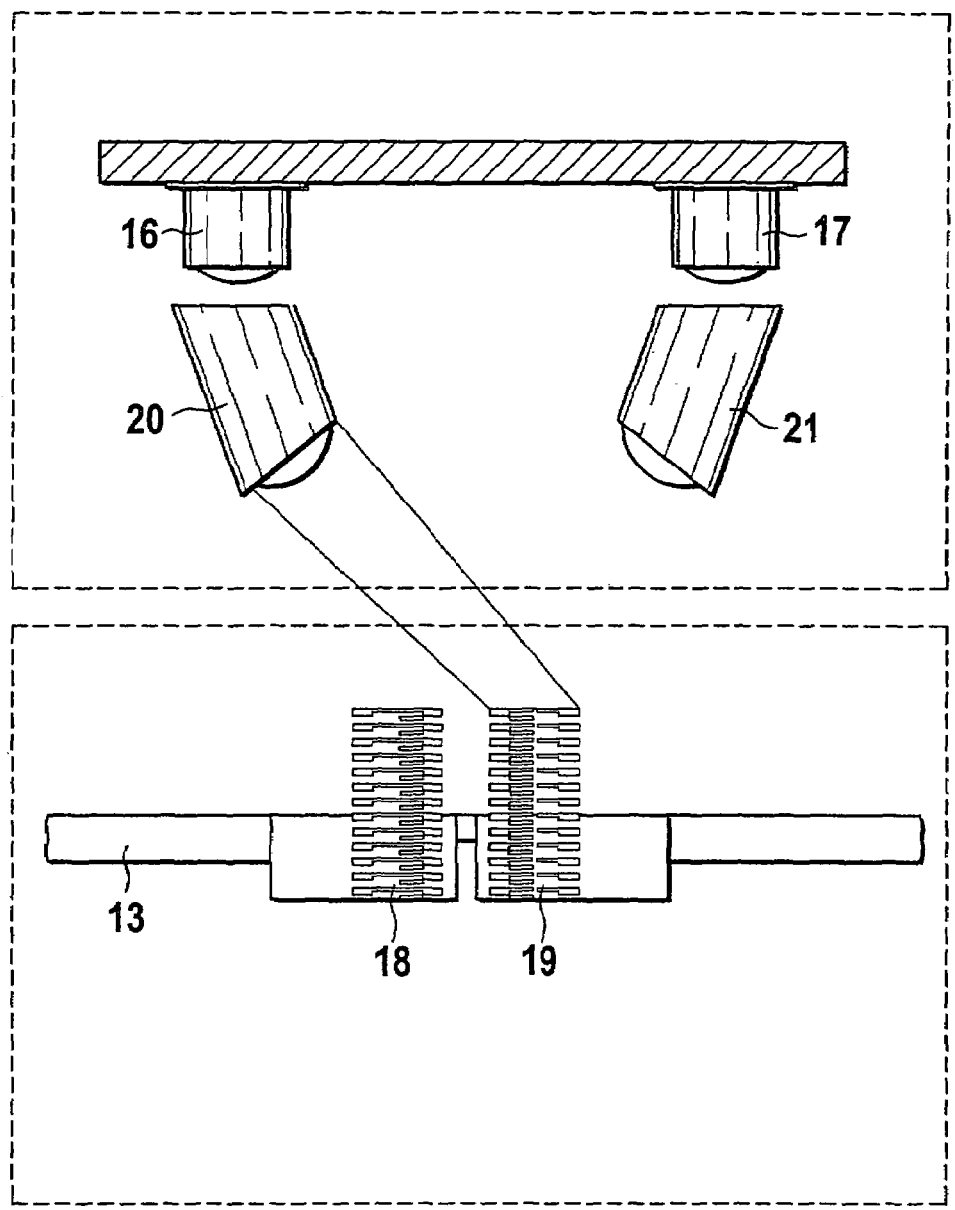
FIG. 6 shows the illumination concept of a sensor with non-symmetrical turning marks.

FIG. 6 shows the illumination concept of a sensor with non-symmetrical turning marks.

Two code disks 18, 19 with patterned surfaces 1 are connected to a rotatable object 13. Two EMR sources 16, 17 are mounted on a printed circuit board 4. In this preferred embodiment of the present invention, the EMR sources are LEDs. Two EMR guides 20, 21 convey EMR from the EMR sources 16, 17 to the code disks 18, 19. In this preferred embodiment of the present invention at least one light guide conveys EMR emitted by at least one EMR source to the at least one patterned surface at an advantageous illumination angle $\beta_a$, which attains a maximum reflection intensity when the EMR is reflected by the non-symmetrical turning marks on the illuminated patterned surface 1.

Figure 7:
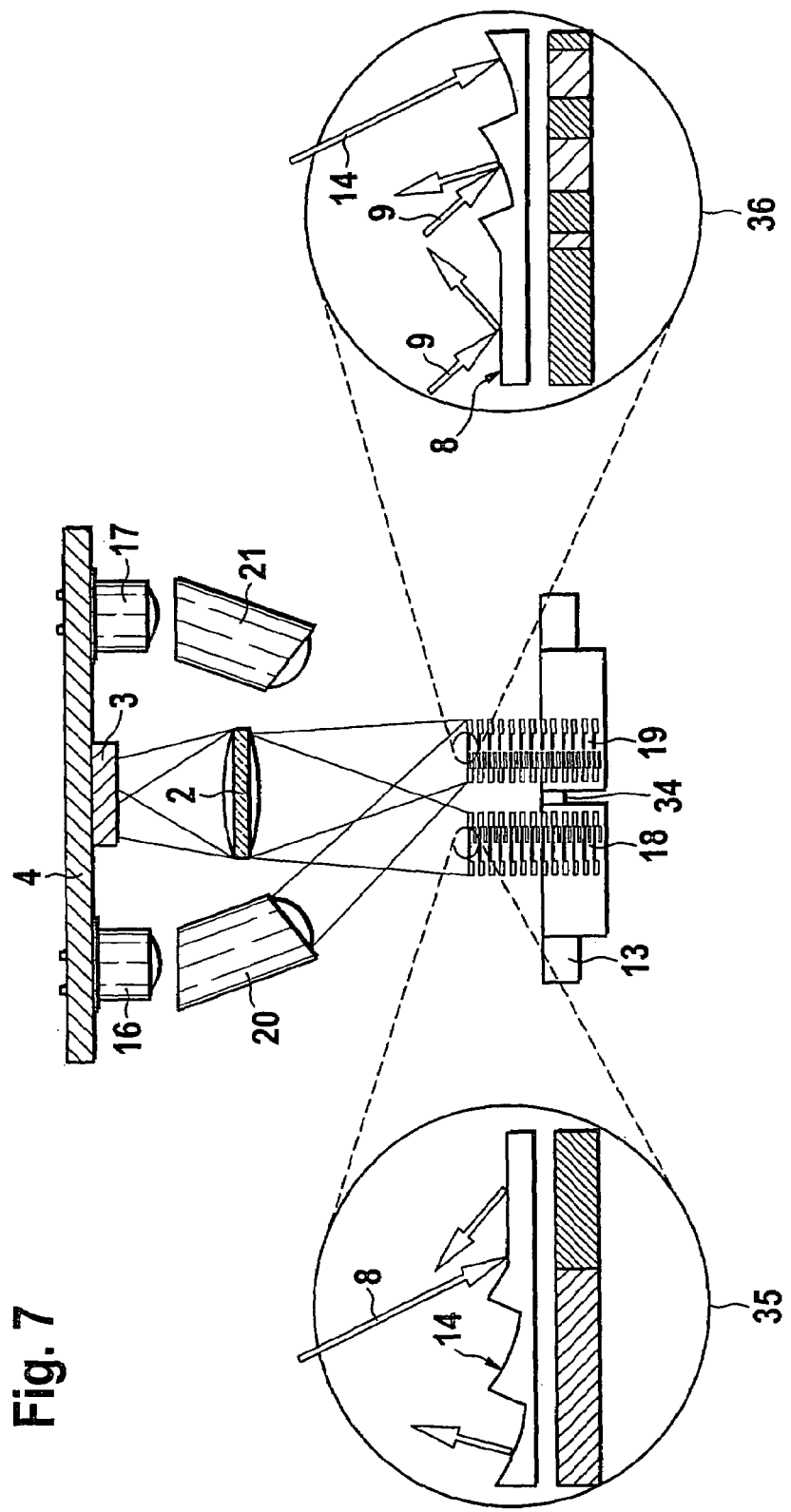
FIG. 7 shows a total concept for a sensor containing patterned surfaces with non-symmetrical turning marks.

FIG. 7 shows a total concept for a sensor containing non-symmetrical turning marks.

The sensor includes two code disks 18, 19, with patterned surface 1 attached to two different parts of a rotatable object 13, a member 34 of predetermined torsional stiffness between these two parts, two EMR sources 16, 17 and an ASIC 3 mounted to a printed circuit board 4 and a lens 2. FIG. 7 shows two magnifications 35, 36 of the patterned surfaces 1 of the two code disks 18, 19. Both magnifications 35, 36 show flat laser marks 8 and sawtooth-shaped non-symmetrical turning marks 14. In this preferred embodiment of the present invention, the non-symmetrical sawtooth-shaped turning marks are aligned in opposite directions and slightly accurate in form. This alignment of the non-symmetrical turning marks has the advantage, that the illumination of the two code disks under the advantageous illumination angle $\beta_a$ and the focusing of the reflected EMR can be achieved within a compact sensor housing. In this preferred embodiment of the present invention, the EMR conveyed by the two EMR guides can have crossing beam paths. This means, that the first EMR guide 20 conveys EMR from the first EMR source 16 to the second code disk 19 and that the second EMR guide 21 conveys EMR from the second EMR source 17 to the first code disk 18. By aligning the non-symmetrical turning marks 14 of the two code disks 18, 19 in opposite directions, the non-symmetrical turning marks 14 of both code disks reflect the incident EMR 9 into one imaging system (lens 2). The illuminated pattern on the code disks 18, 19 are reflected through the lens onto the ASIC 3. Based on the pattern, the angle and the torsional deflection of the rotatable object 13 are calculated in the ASIC 3. The distortion is proportional to the torque exerted on the rotatable object 13.

In a preferred embodiment of the present invention, the at least one lens focuses substantially EMR reflected by the laser marks onto the array of EMR detectors and EMR reflected by the non-symmetrical turning marks is reflected out of the imaging system. Therefore, a different illumination angle and a different position of the imaging system relatively to the code disks are necessary. The advantageous illumination angle 37 for this embodiment of the present invention is marked in the right part of FIG. 4b. As a result, the laser marks generate bright areas on the ASIC 3 and the non-symmetrical turning marks generate dark areas. According to FIG. 4b the reflection intensity $I_3$ is higher than the reflection intensity $I_2$ for any illumination angle $\beta$. That means, a preferred illumination inclination angle with the biggest intensity must be chosen. The preferred illumination inclination angle 38 is shown in FIG. 4b.

In a preferred embodiment of the present invention, the angle and torque to be determined by the invented sensor are the steering angle and the steering wheel torque or the steering shaft torque of a motor vehicle.

The invention claimed is:

1. An optical sensor for determining the angular displacement and the torque of a rotatable object (13), the sensor containing at least one patterned surface (1), an ASIC (3), at least one lens (2) and at least one EMR source (16, 17), the ASIC (3) comprising processing means and an array of detectors for EMR, the at least one EMR source (16, 17) illuminating the patterned surface (1) and the at least one lens (2) focusing a part of the reflected EMR (5) from the patterned surface (1) onto the array of detectors for EMR, wherein the patterned surface (1) contains a pattern including turning marks and laser marks (8), the at least one lens (2) focusing substantially EMR reflected by the turning marks (14) onto the array of detectors and the turning marks (14) being non-symmetrical, and wherein the EMR source (16, 17) illuminates the patterned surface (1) under an advantageous illumination angle (15), which produces a maximum reflection intensity of EMR reflected by the non-symmetrical turning marks (14).

2. The optical sensor according to claim 1, wherein an EMR guide (20, 21) conveys EMR emitted by the EMR source (16, 17) to the patterned surface (1) at the advantageous illumination angle (15) of the non-symmetrical turning marks (14).

3. The optical sensor according to claim 1, wherein the non-symmetrical turning marks (14) form a sawtooth surface on the patterned surface (1).

4. The optical sensor according to claim 1, wherein at least one EMR source (16, 17) is an LED.

5. The optical sensor according to claim 1, wherein the array of detectors is array of photo diodes.

6. The optical sensor according to claim 1, wherein the at least one patterned surface includes two patterned surfaces, and wherein the non-symmetrical turning marks (14) of the two patterned surfaces (1) are aligned in opposite directions.

7. The optical sensor according to claim 6, wherein two EMR guides (20, 21) each convey EMR to one of the two patterned surfaces (1), at the advantageous illumination angle (15), at which the non-symmetrical turning marks (14) of both patterned surfaces (1) reflect the EMR in the direction of the at least one lens (2).

8. The optical sensor according to claim 7, wherein the two EMR guides (20, 21) each convey EMR to one of the two patterned surfaces (1), at the advantageous illumination angle (15), at which the symmetrical laser marks of both patterned surfaces (1) reflect the EMR in the direction of the at least one lens (2).

9. The optical sensor according to claim 1, wherein the angular displacement and the torque to be determined are the steering angle and the steering wheel torque or the steering shaft torque of a vehicle.

* * * * *